Figure 1:
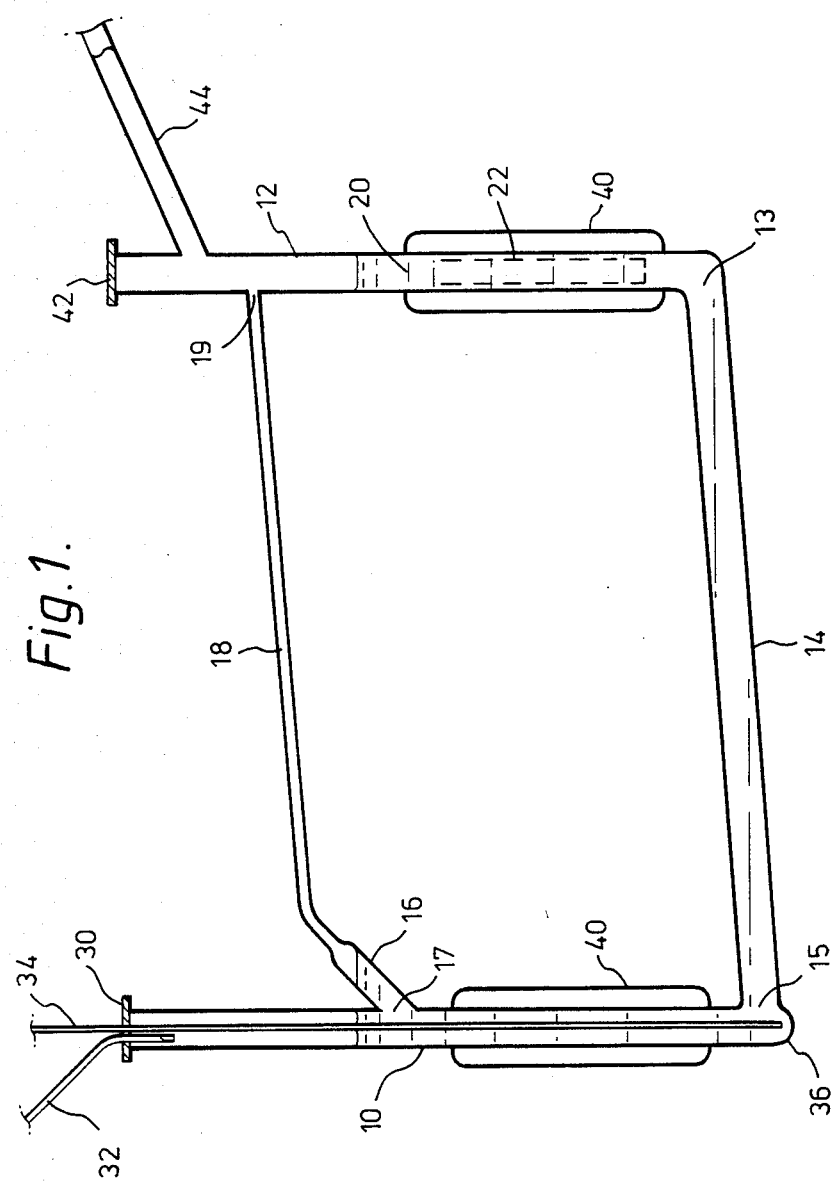

United States Patent [19]

Hodgson et al.

[11] Patent Number: 4,521,400
[45] Date of Patent: Jun. 4, 1985

[54] AGITATOR APPARATUS

[75] Inventors: Thomas D. Hodgson, Abingdon; William R. Foot, Poole, both of England

[73] Assignee: United Kingdom Atomic Energy Authority, London, England

[21] Appl. No.: 424,250

[22] Filed: Sep. 27, 1982

[30] Foreign Application Priority Data

Sep. 29, 1981 [GB] United Kingdom ............... 8129387

[51] Int. Cl.³ .............................................. B01F 11/00
[52] U.S. Cl. ................................. 423/658.5; 75/101 R; 422/159; 422/281; 423/4
[58] Field of Search ............... 423/4, 20, 658.5; 422/903, 159, 255, 281, 132; 138/26; 266/101, 170; 75/101 R; 137/251, 253

[56] References Cited

U.S. PATENT DOCUMENTS

| | | | |
|---|---|---|---|
| 2,468,660 | 4/1949 | Gjedebo | 266/101 X |
| 2,660,518 | 11/1953 | White | 422/258 |
| 3,034,868 | 5/1962 | Erickson | 423/4 X |
| 3,327,728 | 6/1967 | Huling | 137/254 |
| 3,813,464 | 5/1974 | Ayers | 423/20 |

FOREIGN PATENT DOCUMENTS 889797 2/1962 United Kingdom ............... 137/251

Primary Examiner—Deborah L. Kyle
Assistant Examiner—Virginia B. Caress
Attorney, Agent, or Firm—William R. Hinds

[57] ABSTRACT

Apparatus for agitating and circulating a liquid 20 comprising a vessel having two upright chambers 10, 12 and two vertically displaced ducts 14, 18 connecting the chambers 10, 12. In use of the apparatus, a steady flow of gas into the top of one chamber 10 provides both an oscillation and a circulation of the liquid 20 in the apparatus, as the gas is periodically vented through the upper duct 18.

The apparatus has one application in the dissolution of material from nuclear fuel pins during reprocessing.

10 Claims, 2 Drawing Figures

AGITATOR APPARATUS

This invention relates to apparatus in which a liquid held in a vessel may be agitated, and more particularly but not exclusively, to apparatus in which the dissolution of material from irradiated nuclear fuel pins may be accomplished during reprocessing, such nuclear fuel pins comprising nuclear fuel material enclosed in nuclear fuel cans.

It is usual to chop each fuel pin into short pieces, typically 25 mm or 50 mm long, to collect a number of the pieces in a perforated stainless steel basket and to immerse them in a dissolvent liquid such as boiling or near boiling nitric acid. The acid dissolves the nuclear fuel and fission products from the pieces and leaves behind empty hulls (empty portions of nuclear fuel can). This dissolution process is customarily carried out in a vessel with an approximately U-tube configuration, and with an upper connecting tube so that the liquid can be circulated around the vessel, for example as described in UK patent specification No. 1,187,369, the circulation being brought about by injecting gas into the liquid near the base of one of the limbs of the U-tube, or by heating the liquid in one of the limbs and cooling the liquid in the other limb to achieve convectional circulation of the liquid. The U-tube configuration is typical of dissolvers whose diameter is restricted by criticality considerations and which therefore have a large length to diameter ratio. Because of the large length to diameter ratio mixing throughout the loop is an important consideration.

According to one aspect of the present invention, in an apparatus in which a liquid may be agitated and circulated, the apparatus comprising, a vessel for containing a liquid and comprising two upwardly extending chambers and two vertically displaced ducts each connected between respective ports in the two chambers, means are provided for applying a greater gas pressure above the liquid in one said chamber than is applied above the liquid in the other chamber, whereby in operation the surface of the liquid in the one chamber, initially above the upper duct port thereof, is oscillated by the effect of the gas pressure in a cycle in which the liquid surface falls below the upper duct port and said gas above the liquid surface escapes through the upper duct, and the liquid surface subsequently rises above the upper duct port to complete the cycle.

The invention also comprises a method of agitating and circulating a liquid in a vessel, the vessel comprising two upwardly extending chambers and two vertically displaced ducts each connected between respective ports in the two chambers, the upper duct extending acclivitously from one chamber to the other chamber, the method comprising filling the vessel with the liquid until the surface of the liquid is above the upper duct port in the one chamber, and arranging a higher gas pressure above the liquid in the one chamber than that above the liquid in the other chamber, so as to oscillate the liquid in a cycle in which the surface of the liquid in the one chamber falls below the upper duct port and said gas in the one chamber escapes through the upper duct to the other chamber, and the surface of the liquid in the one chamber subsequently rises above the upper duct port to complete the cycle.

Preferably, the upper duct extends acclivitously from the upper duct port in the one chamber to the upper duct port in the other chamber, and the upper duct port in the other chamber is preferably higher than the point to which the liquid level in the other chamber rises during operation of the apparatus.

The upper duct may comprise two portions, a first portion from the upper duct port in the one chamber and extending more acclivitously than a second portion of smaller diameter than the first portion and extending from the first portion to the upper duct port in the other chamber.

The pressure means may comprise means for introducing a pressurized gas above the liquid in the one chamber, or may comprise means for reducing the gas pressure above the liquid in the other chamber.

Advantageously, the lower duct port in the one chamber is located at the bottom of the one chamber, and the lower duct may extend slightly declivitously to the lower duct port in the other chamber, located near the bottom of the other chamber.

Figure 2:
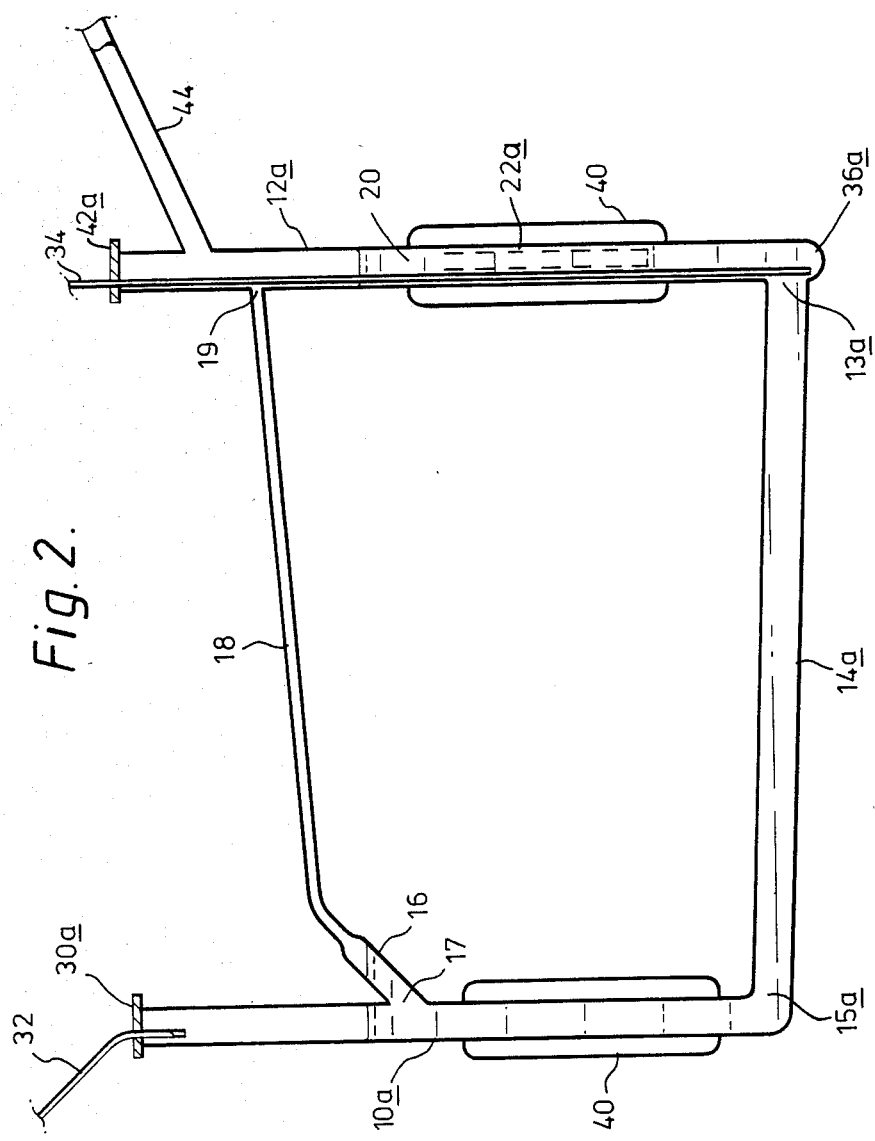

The invention will now be further described by way of example only and with reference to the accompanying drawings, in which:

FIG. 1 shows a side diagrammatic cross-section of an apparatus for the dissolution of nuclear material from irradiated nuclear fuel pins, and FIG. 2 shows a side diagrammatic cross-section of an alternative apparatus.

Referring to FIG. 1, the apparatus shown comprises a vessel in the form of a pressure limb 10 and a dissolver limb 12, which extend vertically and are of similar diameter, connected at their lower ends by a cross duct 14 which gently slopes down from a port 13 at the bottom of the dissolver limb 12 to a port 15 near the bottom of the pressure limb 10. The pressure limb 10 from a port 17 has a side arm 16 extending upwardly at about 45° to the horizontal, which communicates with a narrow tube 18 that extends less acclivitously than the side arm 16 to the dissolver limb 12 at a port 19 above the port 17 and higher than the highest point to which the level of a liquid 20 rises in the dissolver limb 12 in operation of the apparatus, the diameter of the narrow tube 18 being about a quarter of the diameter of the limbs 10, 12. The upper end of the pressure limb 10 is closed by a gas-tight cap 30 through which pass a gas line 32, and an ejector pipe 34 which extends down through the pressure limb 10 into a sump portion 36 of the pressure limb 10 below the port 15. The lower portions of the pressure limb 10 and the dissolver limb 12 above the cross duct 14 are surrounded by respective heat exchange jackets 40. The upper end of the dissolver limb 12 is closed by a removable gas-tight cap 42, and an upwardly sloping side arm 44 near the top of the dissolver limb 12 allows gas to discharge from the apparatus.

In use of the apparatus for the dissolution of irradiated nuclear material from nuclear fuel pins, a perforated basket 22 containing chopped pieces (not shown) of nuclear fuel pins is suspended in the dissolver limb 12, and the apparatus is filled with sufficient liquid 20 (e.g. nitric acid) that the surface of the liquid 20 in the pressure limb 10 is slightly higher than the port 17. The liquid 20 is heated to near boiling by the heat exchange jackets 40, any liquid 20 which evaporates being returned to the apparatus by a condensor (not shown) connected to the side arm 44. If the liquid 20 boils too vigorously as a result of heat produced by exothermic chemical reactions involved in the dissolution process, it may be necessary to pass a cooling medium through the heat exchange jackets 40 to remove excess heat from the apparatus.

The presssure at the surface of the liquid 20 in the pressure limb 10 is then increased above that in the dissolver limb 12 (which is at atmospheric pressure) by passing gas (e.g. air) into the top of the pressure limb 10 through the gas line 32. This pressure difference forces the level of the liquid 20 in the pressure limb 10 down to the port 17 and raises the level of the liquid 20 in the dissolver limb 12 correspondingly. The momentum of the liquid 20 carries it below the port 17 so that the gas escapes from the pressure limb 10 through the side arm 16 and the narrow tube 18 into the dissolver limb 12, carrying some liquid 20 with it. As the gas leaves the pressure limb 10, the gas pressure therein decreases and the pressure difference due to the difference in height between the levels of the liquid 20 in the dissolver limb 12 and the pressure limb 10 forces the liquid 20 to flow from the dissolver limb 12 through the cross duct 14 to the pressure limb 10. Once the level of the liquid 20 in the pressure limb 10 has risen above the port 17, the side arm 16 and thus the narrow tube 18 are closed to gas flow, and the gas pressure in the pressure limb 10 increases again to repeat the cycle by forcing down the level of the liquid 20 in the pressure limb 10. Thus a steady flow of gas through the gas line 32 will produce both a circulation and an oscillation of the liquid 20 in the apparatus.

The provision of an oscillation of the liquid 20 in addition to a circulation thereof leads to several advantages in the dissolution of irradiated nuclear material from nuclear fuel pins. Firstly, particles of undissolved nuclear fuel or of insoluble matter tend to be agitated free from the pieces of nuclear fuel pins. Secondly, the agitation of particles falling from the basket 22 to the bottom of the dissolver limb 12 enhances the leaching of any residual fuel from the particles and helps them move down the gentle slope of the cross duct 14 into the sump portion 36 from where the particles of insoluble matter can be removed by the ejector pipe 34. Without oscillation a much greater slope of the cross duct is required to ensure that the particles of insoluble matter do move down into the sump portion 36. And thirdly, the corresponding variations in the pressure of the liquid 20 within the pieces of nuclear fuel pin enhance the dissolution of any nuclear fuel not freely exposed to the liquid 20, as explained in British Patent Specification No. 2 028 293 A (U.S. Pat. No. 4,294,805).

Although the gas flow from the pressure limb 10 to the dissolver limb 12 has been described as being caused by an increased pressure in the pressure limb 10, the dissolver limb 12 being at atmospheric pressure, it could equally well be brought about by decreasing the gas pressure in the dissolver limb 12 and maintaining the pressure limb 10 at atmospheric pressure.

Referring now to FIG. 2, an alternative apparatus is shown which is similar in many respects to the apparatus of FIG. 1. In FIG. 2 the apparatus shown comprises a vessel in the form of a pressure limb 10a and a dissolver limb 12a differing from those previously described in that a cross limb 14a slopes gently down from a port 15a at the bottom of the pressure limb 10a to a port 13a near the bottom of the dissolver limb 12a. The gas line 32 passes through a gas-tight cap 30a at the upper end of the pressure limb 10a, and the ejector pipe 34 passes through a removable gas-tight cap 42a at the upper end of the dissolver limb 12a, and extends down near one side of the dissolver limb 12a into a sump portion 36a of the dissolver limb 12a below the port 13a. Chopped portions of nuclear fuel pins (not shown) are placed in a perforated basket 22a which is relieved locally so as to clear the ejector pipe 34.

The apparatus shown in FIG. 2 is used in a similar manner to that of FIG. 1, with gas pressure being applied through the gas line 32 to the pressure limb 10a. The particles of insoluble matter collect in the sump portion 36a at the bottom of the dissolver limb 12a where they can be removed by the ejector pipe 34, with the gentle slope of the cross-duct 14a inhibiting the particles from moving along the cross duct 14a into the pressure limb 10a.

The two apparatus have been described for use in the dissolution of material from irradiated nuclear fuel pins, but it will be understood that they may be used in the dissolution of other nuclear material, or of non-nuclear material, for example the leaching using hydrochloric acid of calcium carbonate.

Although two heat exchange jackets 40 have been shown in the drawings for maintaining the liquid at an appropriate temperature, in some applications it may be necessary to have more heat exchange jackets 40, for example on the cross duct 14, or fewer thereof.

It will be appreciated that although the pressure limb 10, 10a has been described as extending parallel to the dissolver limb 12, it may be inclined with respect to the dissolver limb 12 if desired.

We claim:

1. An apparatus for oscillating, agitating and circulating a liquid dissolvent for dissolving a solid object, the apparatus comprising, a vessel for containing a liquid dissolvent for the solid object and comprising two upwardly extending chambers and two vertically displaced ducts each connected between respective ports in the two chambers, the upper duct comprising a first portion extending acclivitously from the upper duct port in one said chamber and a second portion of smaller diameter than the first portion extending from the first portion to the upper duct port in the other chamber, means to support the solid object within the liquid, and means for applying a greater gas pressure above the liquid in said one chamber than is applied above the liquid in the other chamber whereby in operation the surface of the liquid in the one chamber initially above the upper duct port thereof is oscillated by the effect of the gas pressure in a cycle in which the liquid surface falls below the upper duct port and said gas above the liquid surface escapes through the upper duct, and the liquid surface subsequently rises above the upper duct port to complete the cycle, such that the liquid dissolvent oscillates over the solid object.

2. An apparatus as claimed in claim 1 wherein the second portion of the upper duct extends less acclivitously than the first portion.

3. An apparatus as claimed in claim 1, wherein the pressure means comprises means for introducing a pressurised gas above the liquid in the one chamber.

4. An apparatus as claimed in claim 1, wherein the pressure means comprises means for reducing the gas pressure above the liquid in the other chamber.

5. An apparatus as claimed in claim 1, wherein the lower duct port in the one chamber is located near the bottom of the one chamber, and the lower duct extends acclivitously to the lower duct port in the other chamber, located at the bottom of the other chamber, and the support means are located within the other chamber.

6. An apparatus as claimed in claim 1, wherein the lower duct port in the one chamber is located at the bottom of the one chamber, and the lower duct extends declivitously to the lower duct port in the other chamber, located near the bottom of the other chamber, and the support means are located within the other chamber.

7. A method of agitating and circulating a liquid dissolvent in a vessel for dissolving a solid object, the vessel comprising two upwardly extending chambers and two vertically displaced ducts each connected between respective ports in the two chambers, the upper duct extending acclivitously from one chamber to the other chamber, the method comprising filling the vessel with a liquid dissolvent for the solid object until the surface of the liquid is above the upper duct port in the one chamber, supporting the solid object within the liquid, and arranging a higher gas pressure above the liquid in the one chamber than that above the liquid in the other chamber, so as to oscillate the liquid over the solid object in a cycle in which the surface of the liquid in the one chamber falls below the upper duct port and said gas in the one chamber escapes through the upper duct to the other chamber, and the surface of the liquid in the one chamber subsequently rises above the upper duct port to complete the cycle.

8. A method as claimed in claim 7, wherein a pressurised gas is introduced into the one chamber.

9. A method as claimed in claim 7, wherein the gas pressure in the other chamber is reduced below atmospheric pressure.

10. A method as claimed in any one of claims 7 to 9, wherein the liquid levels are adjusted so that the upper duct port in the other chamber remains above the surface of the liquid during the cycle.

* * * * *